(12) United States Patent
Faris et al.

(10) Patent No.: US 6,839,472 B1
(45) Date of Patent: Jan. 4, 2005

(54) SOLID STATE OPTICAL INTERCONNECT SYSTEM

(75) Inventors: Sadeg M. Faris, Pleasantville, NY (US); Kelvin Ma, Clifton Park, NY (US); D. T. George Lu, Jersey City, NJ (US); Sanjay Tripathi, Cave Creek, AZ (US); Steven J. Kane, Verona, NJ (US)

(73) Assignee: Reveo, Inc., Elmsford, NY (US)

(*) Notice: Subject to any disclaimer, the term of this patent is extended or adjusted under 35 U.S.C. 154(b) by 179 days.

(21) Appl. No.: 09/841,992

(22) Filed: Apr. 25, 2001

Related U.S. Application Data

(63) Continuation of application No. 09/342,422, filed on Jun. 29, 1999, now Pat. No. 6,259,831.

(51) Int. Cl.$^7$ .............................. G02F 1/295; G02B 6/26
(52) U.S. Cl. ................................ 385/8; 385/16
(58) Field of Search .................... 385/2–8, 16–22, 385/37, 38, 39, 40; 359/276, 245, 321, 40, 65, 94

(56) References Cited

U.S. PATENT DOCUMENTS

| | | | |
|---|---|---|---|
| 3,716,804 A | * | 2/1973 | Groschwitz ................ 332/7.51 |
| 4,153,328 A | * | 5/1979 | Wang .......................... 385/28 |
| 4,220,395 A | * | 9/1980 | Wang et al. .................. 385/11 |
| 4,478,494 A | * | 10/1984 | Soref ............................ 385/8 |
| 4,548,478 A | * | 10/1985 | Shirasaki ....................... 385/8 |
| 4,796,262 A | * | 1/1989 | Michelangeli et al. ......... 372/9 |
| 5,459,591 A | * | 10/1995 | Faris ............................ 385/37 |
| 5,532,852 A | * | 7/1996 | Kalmanash ................... 359/73 |
| 5,586,206 A | * | 12/1996 | Brinkman et al. .............. 385/8 |
| 5,912,997 A | * | 6/1999 | Bischel et al. ................ 385/15 |
| 6,091,867 A | * | 7/2000 | Young et al. ................. 385/17 |
| 6,256,430 B1 | * | 7/2001 | Jin et al. ...................... 385/18 |
| 6,259,831 B1 | * | 7/2001 | Faris et al. ..................... 385/8 |

OTHER PUBLICATIONS

H. Peng and L. Liu, "Optical Two–Dimensional SW–Banyan Network: Optical Implementations, Routing Control, and Determination of Permissible Permutations" 35, Optical Engineering, 1466 (1996).*
T. Yamamoto, J. S. Patel and T. Nakagami, "A Multi–Channel Free Space Coptical Switch Using Liquid Crystal Polarization Control Devices," 1807 SPIE, 345 (1992).*
J.E. Berthold, "Broadband Electronic Switching," IEEE LCS Magazine, 1, 35 (1990).*
K.M. Johnson, M.R. Surette and J. Shamir, "Optical Interconnection Network Using Polarization—Based Ferroelectric Liquid Crystal Gates," Applied Optics, 27, 1727 (1988).*

* cited by examiner

Primary Examiner—Akm Enayet Ullah
(74) Attorney, Agent, or Firm—Richard L. Sampson

(57) ABSTRACT

A solid state optical interconnect system selectively interconnects a plurality of electromagnetic signals between a plurality of inputs and a plurality of outputs. The system includes a plurality of solid state, selectively actuatable 2×2 optical switching elements; and a plurality of all-optical signal paths extending through said 2×2 optical switching elements between the inputs and outputs. Each of said plurality of all-optical signal paths has substantially the same pathlength. This switch element is relatively robust and insensitive to environmental disturbances and has a reconfiguration time which is an order of magnitude faster than conventional opto-mechanical switches which generally require tens of milliseconds before reconfiguration. The switch element provides constant data pathlength for constant latency, loss, and unskewed data output. The element also advantageously provides for convenient scaling to a non-blocking N×N configuration using $N*(\log_2 N-1)$ 2×2 switches rather than conventional approaches which require $N(\log_2 N)$ switches, for a relatively simple and compact configuration.

37 Claims, 13 Drawing Sheets

SOLID STATE OPTICAL INTERCONNECT SYSTEM

RELATED APPLICATIONS

This application is a continuation of U.S. patent application Ser. No. 09/342,422, entitled All-Optical Interconnect Utilizing Polarization Gates, which was filed on Jun. 29, 1999 now U.S. Pat. No. 6,259,831.

BACKGROUND OF THE INVENTION

1. Field of the Invention

This invention relates to the switching and routing of optical signals for telecommunications and optical computing applications. More particularly, the invention relates to an array of polarizing reflectors and programmable phase retarders arranged to couple N optical input signals to any combination of N output locations.

2. Background Information

Throughout this application, various publications, patents and patent applications are referred to by an identifying citation. The disclosures of the publications, patents and patent applications referenced in this application are hereby incorporated by reference into the present disclosure.

High-speed optical interconnections promise to play a major role in the development of national and global information infrastructure, as applications such as supercomputing, telecommunications switching and military $C^3I$ rely on the ability to route data at increasingly high bit rates. Research and development of high-bit-rate optical switches has been pursued worldwide. The Japanese government has funded research on multi-gigabit-per-second optical switches, and Toshiba Corporation has demonstrated a 155 MBIT per-second 64×64 ATM switch. Such throughput is sufficient for many of today's applications, and is comparable to the performance that may be achieved using electronic switching. However, the electronics required to implement these switches becomes particularly difficult as the number (N) of input/output ports increases, i.e. as N approaches or exceeds 64. In addition, the relatively large bandwidth of optical fibers (generally three orders of magnitude greater than that of similar diameter coaxial cables) has not been fully exploized due to the lack of all-optical switches capable of routing terabit-per-second data streams.

Some of the most commonly utilized interconnects in fiber-optic networks are optoelectronic devices. These switches convert optical input signals to electrical signals by use of a photodetector/preamplifier/amplifier array. These converted signals are then typically routed electronically to a diode laser array which regenerates the optical signals. Because the routing is performed electronically, the channel bandwidth in this technique is limited by the bandwidth of the switching electronics, which in theory may approach 620 MHZ, but tends to be on the order of 150–200 MHZ. In addition, once the optical signal is converted into an electronic signal, it becomes susceptible to electrical crosstalk, electromagnetic interference (EMI) noise, and transmission line-type propagation delays.

To overcome these bandwidth limitations, several all-optical switches have been designed and are commercially available. These devices do not require conversion of the optical signal, and are therefore able to accommodate relatively high data rates. Being free from the bandwidth limitations of conventional electronic devices, such all-optical switches may accommodate terabit-per-second data streams to avoid being a bottleneck in all-fiber-optic networks. The approaches utilized to provide such devices are varied, most including mechanical and/or polarization based techniques.

One example of such a device, includes an interconnect available from Optivision, Inc., of Palo Alto, Calif. This device utilizes semiconductor optical amplifiers (SOA'S) in a matrix-vector architecture to achieve high speed switching. This system, however, requires optical amplification to compensate for internal losses, is relatively bulky, and is limited to eight I/O ports.

An example of an opto-mechanical optical interconnect is commercially available from Astarté Networks, Inc. In operation, light from each input fiber is collimated with a lens and is steered to its proper destination with a piezoelectrically-activated mirror. At the output ports, the light is coupled into fibers by use of another set of lenses. While this device exhibits a relatively large (free-space) bandwidth, its mechanical nature introduces several significant drawbacks. One drawback of such a mechanical device is relatively slow reconfiguration time, of approximately 50 ms. In addition, use of piezoelectrically activated mirrors tends to make this switch particularly susceptible to mechanical perturbations, vibrations, etc. These limitations may be somewhat alleviated by a system of tracking servos, however such a stabilization system disadvantageously tends to be relatively complex.

Polarization based switches operate by use of polarization gates. Such devices tend to be robust, mechanically stable, and may achieve microsecond (or faster) reconfiguration times. These devices, however, have been based on relatively cumbersome network architectures, making them impractical and difficult to scale to a system wizh a relatively high. number of I/O ports. Moreover, these devices have unequal pathlengths between various I/O ports thus exhibiting non-constant latency, differing levels of signal attenuation and a skewed output data stream. Thus, a need exists for a high-speed, compact, high-capacity, and robust all-optical interconnect device having a constant signal pathlength for all I/O permutations.

SUMMARY OF THE INVENTION

According to a first aspect of this invention, an optical switching element includes a polarizer which is adapted to receive electromagnetic energy incident thereon from at least two input paths, and is adapted to transmit electromagnetic energy along at least two output paths. The switching element also includes at least one phase shifter disposed within the input paths, the phase shifter being select vely actuatable to pass electromagnetic energy therethrough alternately with and without shifting the phase thereof.

In another aspect of the invention, an optical interconnect device is provided for selectively interconnecting a plurality of electromagnetic signals between a plurality of inputs and a plurality of outputs. The optical interconnect device includes a plurality of optical switching elements of the aforementioned first aspect of the invention, and a plurality of all-optical signal paths extending between the plurality of inputs and the plurality of outputs. The plurality of all-optical signal paths includes the at least two input paths and the at least two output paths of the optical switching elements.

In a further aspect of the invention, a method is provided for selectively interconnecting a plurality of electromagnetic signals between a plurality of inputs and a plurality of outputs. The method includes the steps of:

(a) providing a polarizer adapted to receive the plurality of electromagnetic signals incident thereon from at least two input paths, and to transmit the plurality of electromagnetic signals along at least two output paths;

(b) disposing at least one phase shifter within the at least two input paths, the at least one phase shifter being selectively actuatable to pass electromagnetic signals therethrough alternately with and without shifting the phase thereof; and (c) selectively actuating the at least one phase shifter.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Figure 1:
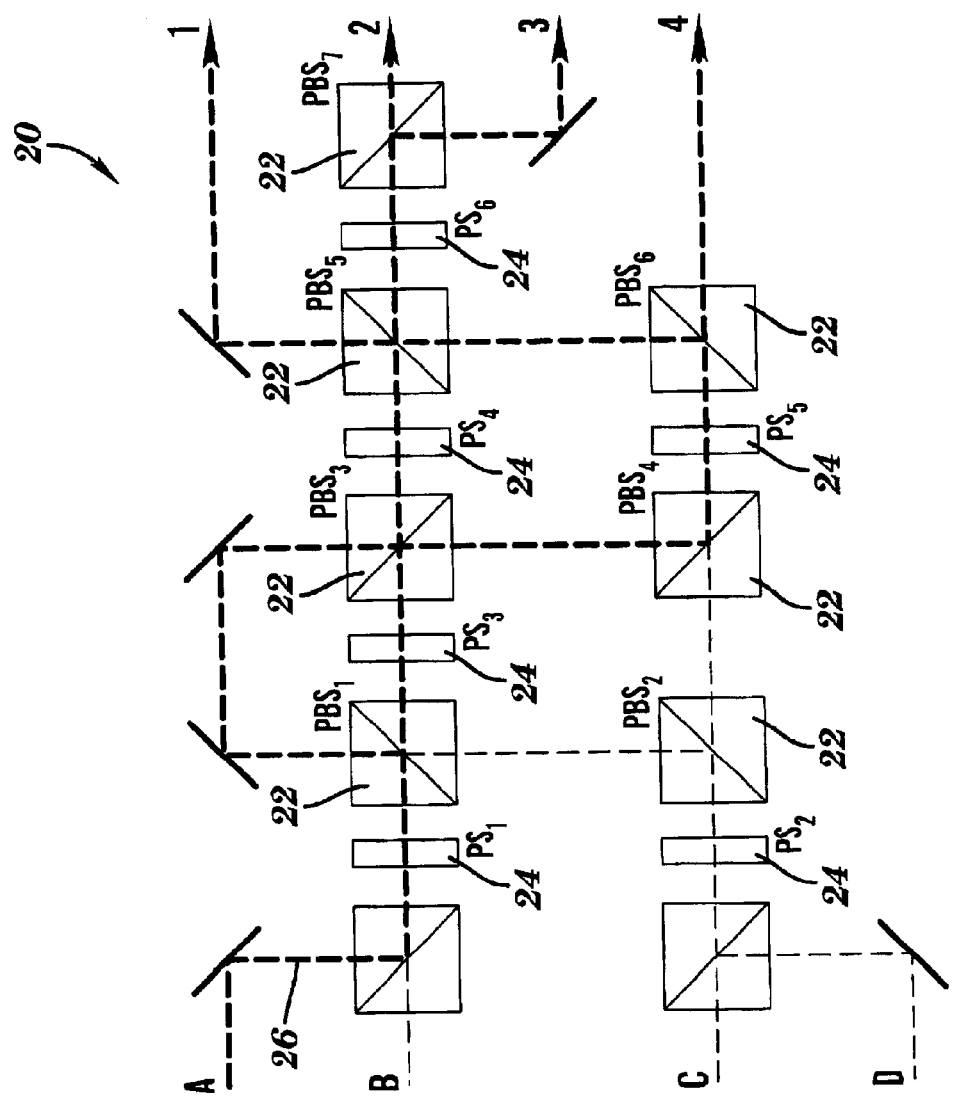
FIG. 1 is a partially schematic representation of an optical 4×4 switch of the prior art.

Referring to the figures set forth in the accompanying Drawings, the illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Referring to FIGS. 3A–6, an apparatus constructed according to the principles of the present tnvention is shown. The present invention includes a switch element 100 (FIGS. 3A–3B) which utilizes a single polarizer 110 to couple two discreet inputs to any combination of two discreet outputs along non-blocking optical paths. This switch element 100 may be conveniently networked to additional switch elements 100 for scaling to switches having larger numbers (N) of inputs and outputs such as shown as switches 150 and 150' in FIGS. 4–6. The present invention provides advantages typically associated with conventional polarization gates, including terabit per-second data rates, to facilitate use in fiber-optics networks. Moreover, unlike conventional optomechanical switches, the present invention is relatively robust and insensitive to environmental disturbances. The invention also is provides a reconfiguration time which is at least approximately an order of magnitude faster than conventional optomechanical switches which generally require tens of milliseconds for reconfiguration. Furthermore, the present invention provides constant data pathlength for constant "latency", loss, and unskewed data output. The present invention also advantageously provides for convenient scaling to a non-blocking N×N configuration using $N(\log_2 N-1)$ 2×2 switches rather than conventional approaches which require $N(\log_2 N)$ switches, for a relatively simple and compact configuration.

Where used in this disclosure, the term "optical" shall refer to a device or pathway through a device adapted to channel electromagnetic energy. Similarly, the term "all-optical" shall refer to a device or network of devices adapted to transmit or channel electromagnetic radiation therethrough without converting the energy into other types of signals, such as electrical or electronic signals. The terms "electromagnetic radiation" or "electromagnetic energy" shall refer to a series of electromagnetic waves within the electromagnetic spectrum ranging from gamma rays to radio waves and including visible light. The term "transparent" shall be defined as being capable of permitting a signal to flow therethrough without substantially altering the phase or polarity thereof. In addition, as used herein the term "computer" or "computer sub-system" shall refer to any computer, computer workstation, dedicated processor, microprocessor or dedicated micro-controller.

Referring now to FIGS. 1–13, the prior art and the apparatus of the present invention will be more thoroughly described. As shown in FIG. 1, a prior art 4×4 switch based on a conventional 1×2 polarization gate, commonly known as the Fredkin 4×4 switch, includes seven polarizing beam splitters 22, six liquid crystal phase shifters 24 and other optical components. This device may accept four input beams A, B, C and D and steer them to any combination of output ports 1, 2, 3 and 4. Routing for input A to the output ports is shown by dotted lines 26.

This architecture has several significant drawbacks. For example, $N*(N-1)/2$ gates are required for an N×N interconnection. For 16×16 switch this would require 120 polarizers which disadvantageously would tend to make such a device expensive and bulky. Moreover, the optical pathways of this device are not non-blocking. Reconfiguration of the system requires interruption and delay of one or more pathways or channels to prevent two or more signals from simultaneously occupying the same channel. Additional optical elements would be required to provide contention-free (non-blocking) routing as will be discussed in greater detail hereinbelow.

In addition, switch 20 has un-equal pathlengths between I/O. In other words, the number of elements traversed by each input beam to various outputs is not equal. For example, a signal traveling from input A to output 4 would traverse a longer path than a signal traveling from input A to output 2. Accordingly, equal intensity inputs will be attenuated differently by the switch 20. The un-equal pathlengths also provide non-constant latency, leading to a skewed output data stream.

Furthermore, switch 20 is relatively difficult to scale up to large numbers N of I/O and is difficult to implement in a compact size. Relatively long optical paths tend to amplify component misalignment generated by environmental and mechanical perturbations.

Figure 2:
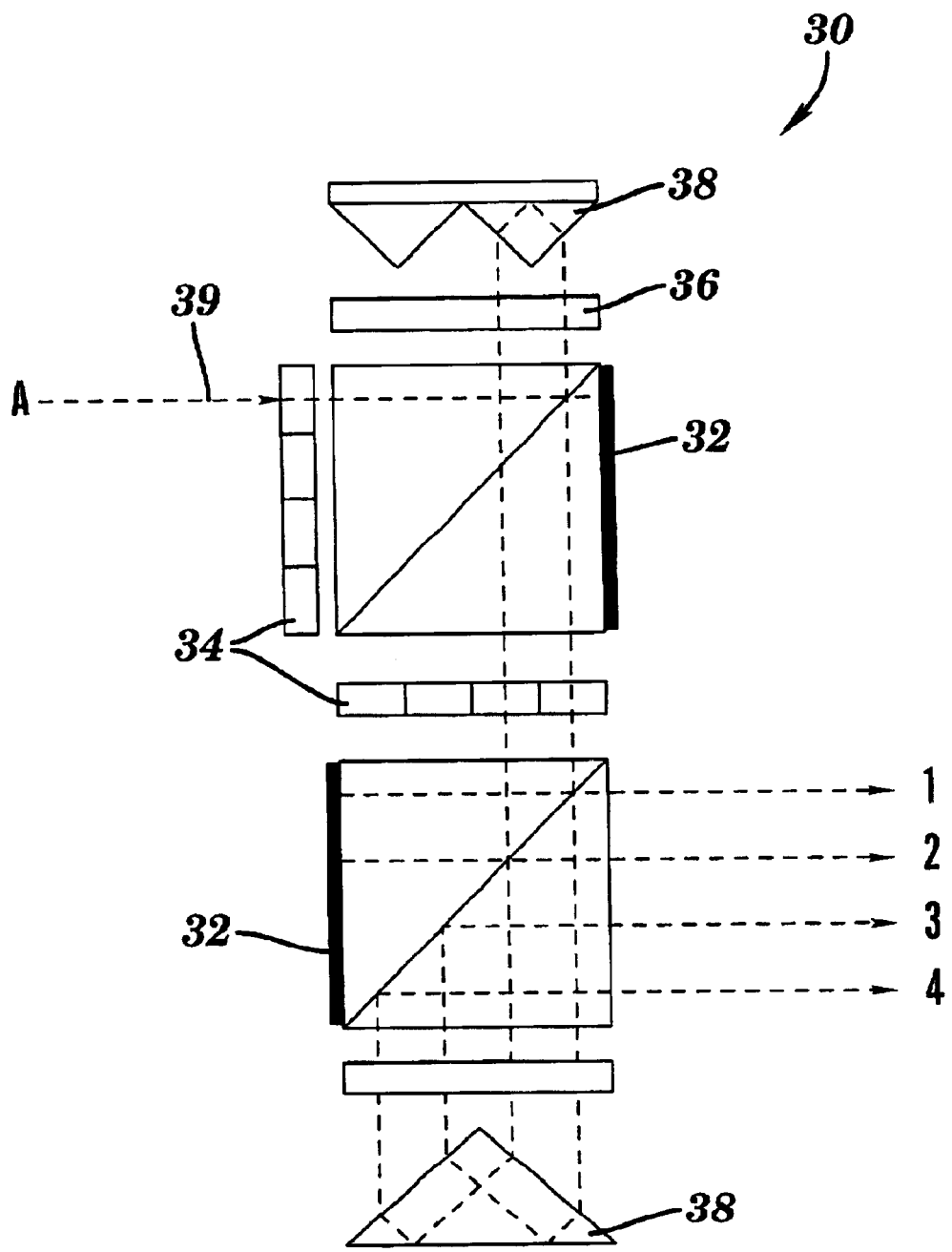
FIG. 2 is a partially schematic representation of another optical 4×4 switch of the prior art.

Turning to FIG. 2, prior art switch 30 is a device commonly known as the Fujitsu/Bellcore switch described in an article by T. Yamamoto, J. S. Patel, and T. Nakagami, entitled 'A multi-channel free-space optical switch using liquid crystal polarization control devices,' Proc. SPIE, 1807, 345 (1992). As shown, this device employs polarizers 32, liquid crystal phase shifters 34, quarter-wave plates 36 and beam displacing prisms 38. Routing of a signal from input A to all four possible output ports 1, 2, 3 and 4 is shown with dotted lines 39.

This device may provide switching speeds of up to 1 gigabit per-second. However, similarly to switch 20 of FIG. 1, switch 30 provides unequal pathlengths between I/O ports. Many of the aforementioned drawbacks of switch 20 thus also pertain to switch 30, namely varying degrees of attenuation and non-constant latency leading to a skewed output data stream. In addition, switch 30 is relatively difficult to scale up to large N, since the 4×4 switch cannot be easily used as a basic building block for cascading to a larger N×N device. A completely different physical layout for the components (the polarizing beam splitters and phase snifters) would generally be required.

Still further, although only eight phase shifters 34 are used in the 4×4 device shown, switch 30 requires several refractive prisms for beam displacement (three are required for the 4×4 switch, and more would be needed for an 8×8 or 16×16 device). Such complexity and lack of scalability make it a relatively unattractive candidate for high performance networking.

Figure 3B:
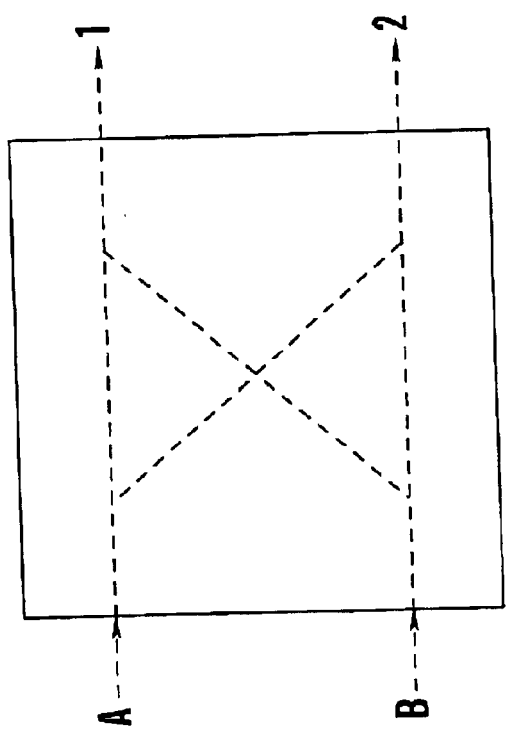
FIG. 3B is a block diagram of the 2×2 switch element of FIG. 3A.
Figure 3A:
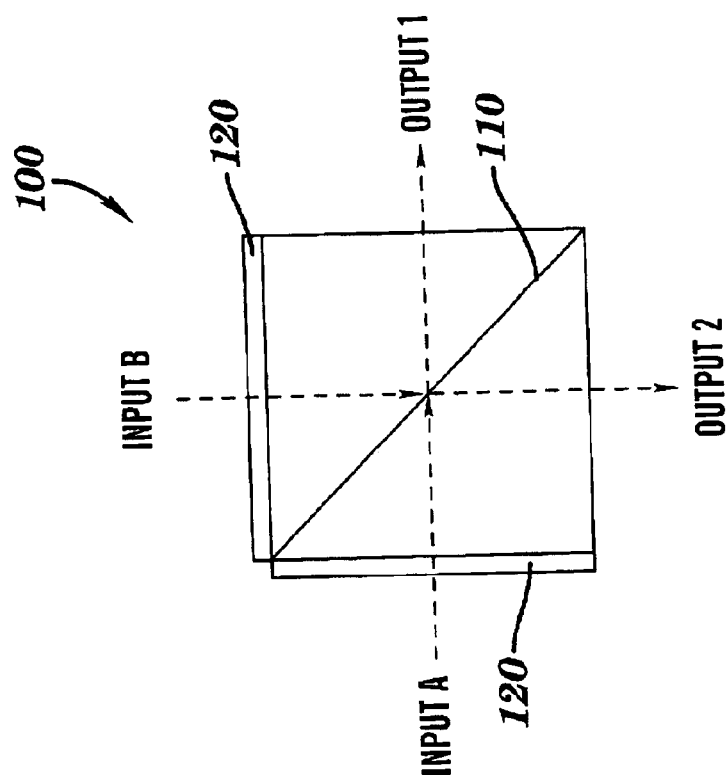
FIG. 3A is a partially schematic representation of a 2×2 switch element of the present invention.

Turning now to FIGS. 3A and 3B, the present invention includes a 2×2 basic switch element 100 which includes a polarizer 110 adapted to receive electromagnetic or optical energy incident thereon from at least two discreet input paths A and B and to transmit the energy along at least two discreet output paths 1 and 2. In addition, an electrically actuatable phase shifter or π-cell 120 is disposed in each of the input paths A and B to pass the electromagnetic energy therethrough alternately with and without shifting the phase thereof. The polarizer 110 and phase shifter or π-cell 120 may be of any suitable construction such as, for example, those described in U.S. Pat. No. 5,459,591, entitled ELECTROMAGNETIC ENERGY BEAM STEERING DEVICES, issued on Oct. 17, 1995 to Sadeg M. Faris or as described in U.S. patent application Ser. No. 08/784,440 (the '440 application) entitled FLAT PANEL DISPLAY AND A METHOD OF FABRICATION THEREFOR, filed on Jan. 16, 1997 by Sadeg M. Faris. Other potentially suitable polarizers 110 are those described in U.S. patent application Ser. No. 08/807,020 (the '020 application), entitled POLARIZER DEVICES AND METHODS FOR MAKING THE SAME, filed on Feb. 26, 1997 by Fan, et al. and those described in U.S. patent application Ser. No. 09/151,909 (the '909 application), entitled STRUCTURALLY ORDERED ARTICLES, FABRICATION METHOD AND APPLICATIONS OF THE SAME, filed on Sep. 11, 1998 by Fan, et al.

Briefly described, polarizer 110 may comprise a conventional MacNiell-type polarizing reflector fabricated as a quarter-wave film stack, a cholesteric liquid crystal film, or an artificial inorganic reflecting polarizer. These devices operate in a known manner to selectively reflect light having a predetermined polarization state (e.g. vertical or "s-polarized" light) and transmit the other polarization state (e.g. horizontal or "p-polarized" light). Similarly, polarizer 110 may be adapted to selectively reflect circularly polarized light (e.g. left-hand circularly polarized "LHCP" light) and transmit the other polarization state (e.g. right-hand circularly polarized "RHCP" light). Throughout this disclosure, opposite polarization states, whether s or p or LHCP or RHCP light will be referred to simply as opposite polarization states P1 and P2.

The π-cell or phase shifter 120 is an electrically controllable half-wave retarder. Typically, when no electric field is applied to the cell it behaves as a half wave retarder. A beam having a polarization state P1 incident on the phase shifter 120 is converted to a P2 polarized beam as it passes therethrough. When a predetermined electric potential is applied to the walls of the a-cell, the retardation property of the cell is eliminated so that a P1 polarized beam maintains its state of polarization as it passes through the cell.

In the prior art architectures shown and described with respect to FIGS. 1 and 2, each switch element accepts only one input and can steer that input to one of two possible outputs. The switch element 100 of the present invention, however, advantageously utilizes the reciprocal nature of polarizer 110 to accept at least two inputs (i.e., incident on opposite sides of polarizer 110) and couple them to either of two discreet outputs 1 and 2. Thus, switch element 100 fabricated as a square or cube as shown, effectively utilizes all four surfaces thereof for I/O, to provide a 2×2 switch element. The construction is relatively simple, compact and optomechanically stable due to its solid state or monolithic configuration. A block diagram of switch element 100 is shown in FIG. 3B.

Operation of the switch element 100 is as follows. By convention, energy incident along inputs A and B is specified to be of the P1 polarization state. If phase shifters 120 are non-activated, these beams at inputs A and B will pass through the switch to outputs 1 and 2, respectively. However, upon activation of the phase shifters, beams at inputs A and B are converted to the P2 state, so that each beam will be reflected by the polarizer 110 to output ports 2 and 1, respectively. Table 1 summarizes the interconnection under various conditions.

TABLE 1

| Both Phase Shifters | Signal Routing |
| --- | --- |
| 'OFF' | Input A → Output 1 |
|  | Input B → Output 2 |
| 'ON' | Input A → Output 2 |
|  | Input B → Output 1 |

Thus, basic switch element 100 of the present invention is a 2×2 switch adapted for coupling input A to either output 1 or 2, and likewise, couple input B to optical output 1 or 2 as shown schematically in FIG. 3B. This basic switch element 100 also may advantageously be further cascaded to larger N×N switches, such as to a 4×4 switch shown in FIG. 4.

Figure 4:
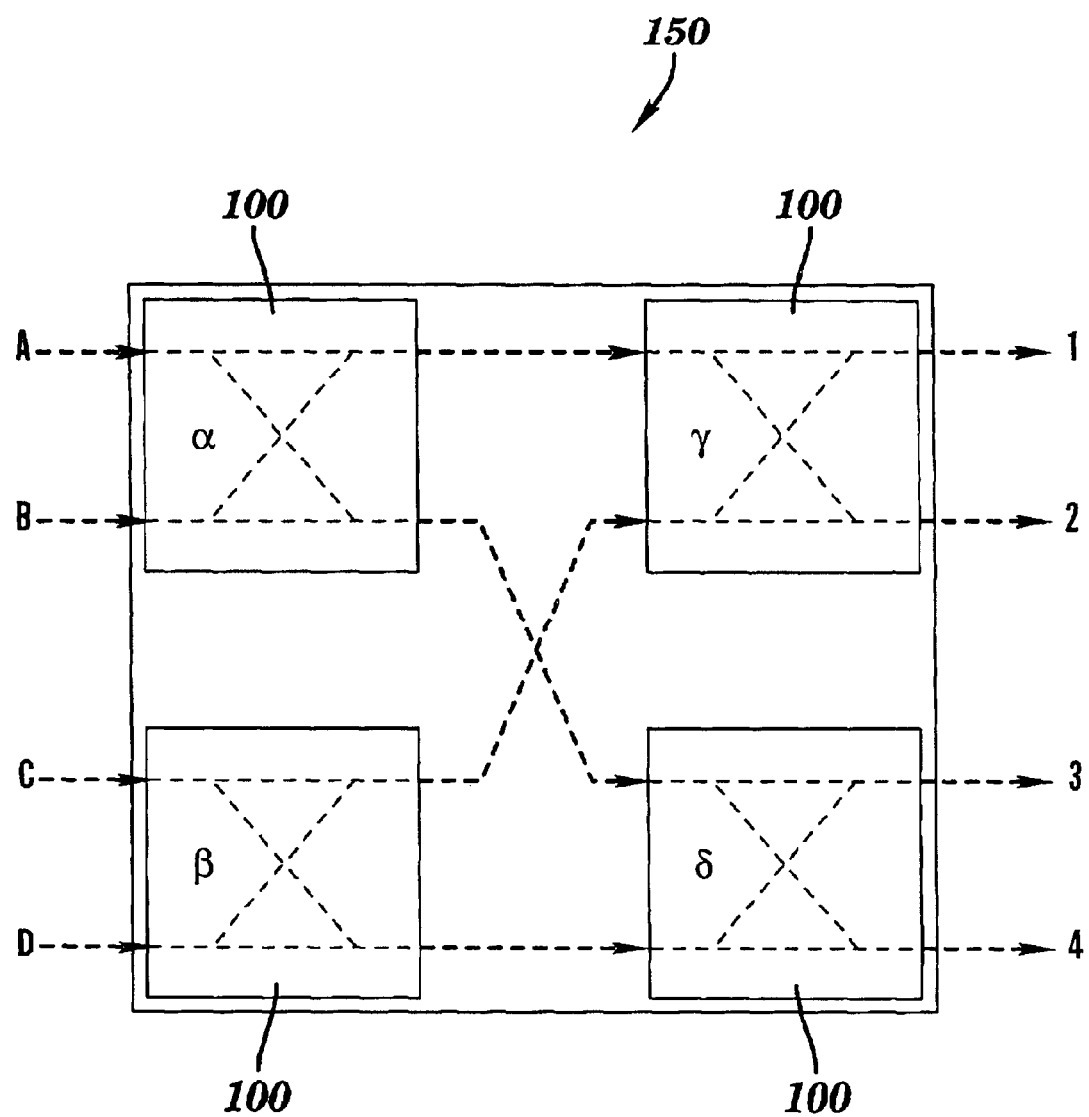
FIG. 4 is a block diagram of a 4×4 switch of the present invention.

Turning now to FIG. 4, four basic switch elements 100 are cascaded or interconnected using the logic shown to provide a 4×4 switch 150. As shown, outputs from two switch elements 100 (labeled α and β) become the input signals for a second set of two 2×2 switch elements 100 (labeled γ and δ). In this manner four inputs A, B, C and D can be routed to any combination of four outputs 1, 2, 3 and 4. This interconnection logic may be implemented in physical hardware simply by routing the outputs from switch element a to switch element γ and δ, and similarly routing the outputs of switch element β.

Figure 5:
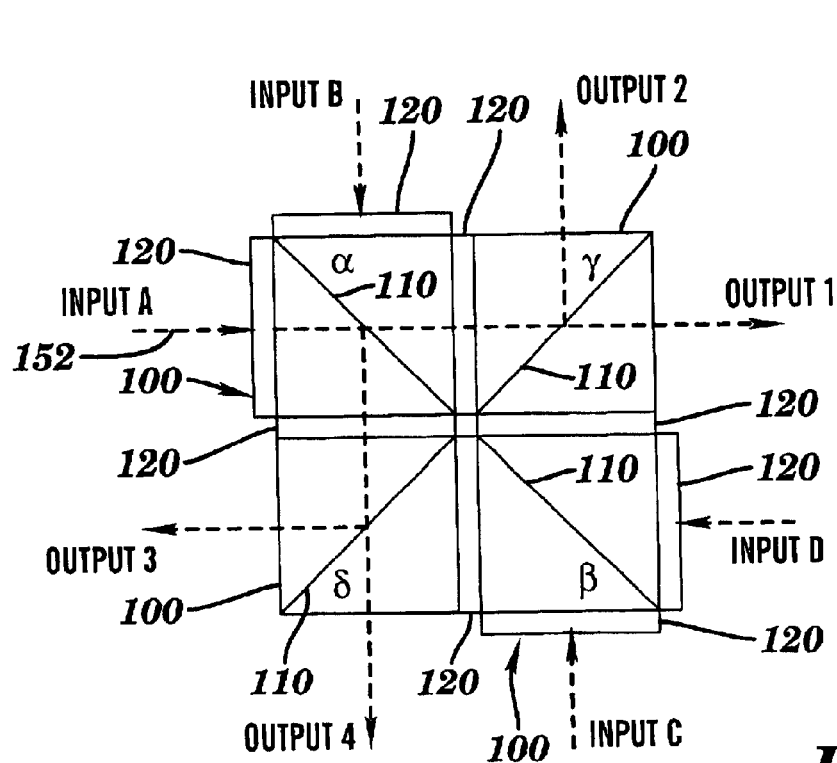
FIG. 5 is a partially schematic representation of an embodiment of the 4×4 switch of FIG. 4.
Figure 6:
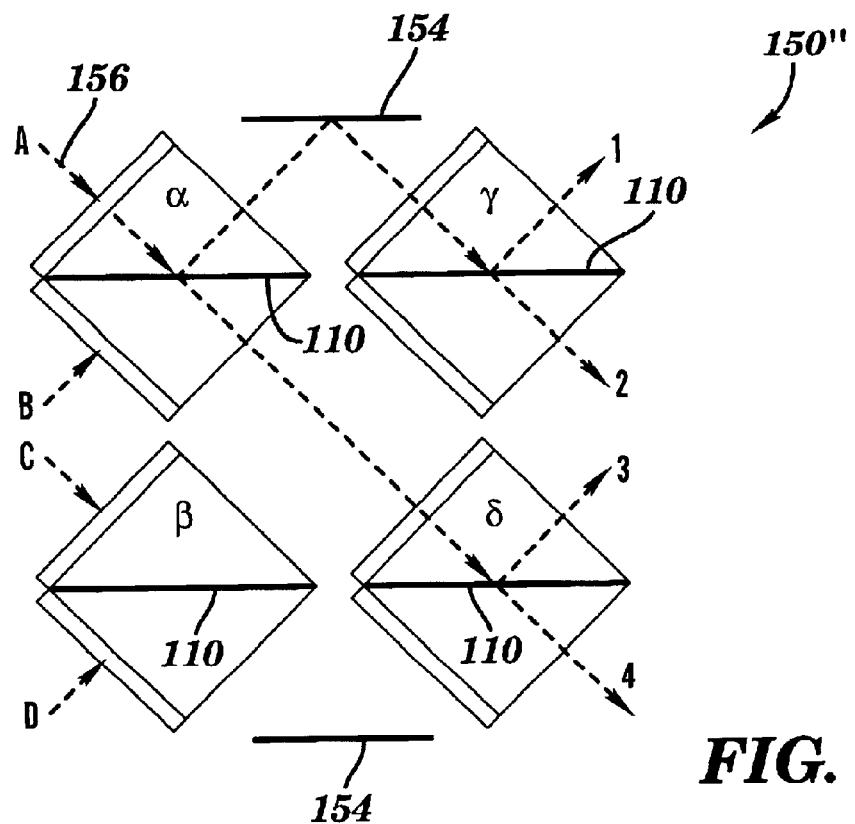
FIG. 6 is a partially schematic representation of an other embodiment of the 4×4 switch of FIG. 5.

Examples of this implementation are shown in FIGS. 5 and 6. Turning to FIG. 5, four switching elements 100 may be closely packed in a square arrangement to form 4×4 switch 150', with routing from input A to all four possible output ports 1 through 4 shown by dotted lines 152. This switch 150' follows the routing logic diagram of FIG. 4, as one of the outputs from cube α becomes an input to cube γ, and the other input from α becomes an input to cube δ, etc. Advantageously, this 4×4 switch 150' provides constant pathlengths therethrough to provide constant latency and constant loss for all possible routing paths. Each input beam passes through only two polarizers 110 and two phase shifters 120 for all input/output permutations. Moreover, switch 150' provides a compact size and may conveniently accommodate a "duplex" (paired) fiber-optic connection, as each side of the switch has one set of spatially parallel I/O ports. The switch element 150' may be provided with conventional fiber-optic connectors to facilitate modular construction of larger N×N switches, such as in the manner described hereinbelow, using fiber-optic rather than free-space interconnection. This modular approach facilitates flexible reconfiguration (i.e., for different N), manageable serviceability and simplified implementation of redundancy.

Turning now to FIG. 6, another embodiment of 4×4 switch 150 is shown as switch 150". in this embodiment, the four basic switch elements 100, shown as α,β,γ and δ are arranged in a corner to corner or diamond pattern as shown. To satisfy the routing requirements of FIG. 4, this switch 150" includes a mirror 154 disposed at opposite ends of the switch. These mirrors may be fabricated as silvered prisms to facilitate monolithic or solid state construction. Routing from input A to all possible output ports is shown by dotted lines 154. The logic of FIG. 4 is satisfied. For example, energy input to cube α may be channeled directly to cube δ, or may reflect off one of the mirrors 154 towards switch element γ. This arrangement thus provides a non-blocking, contention free 4×4 switch using only four polarizers 110.

Switch 150" provides the advantage of being easily scalable to high-N networks in a substantially solid state manner, i.e. without the need for fiber-optic cabling between elements, etc. Moreover, this 4×4 switch 150" may serve as a basic building block for a number of architectures known to those skilled in the art of switching devices, including Beneš, shuffle-exchange, omega, PM2I and others.

Figure 7:
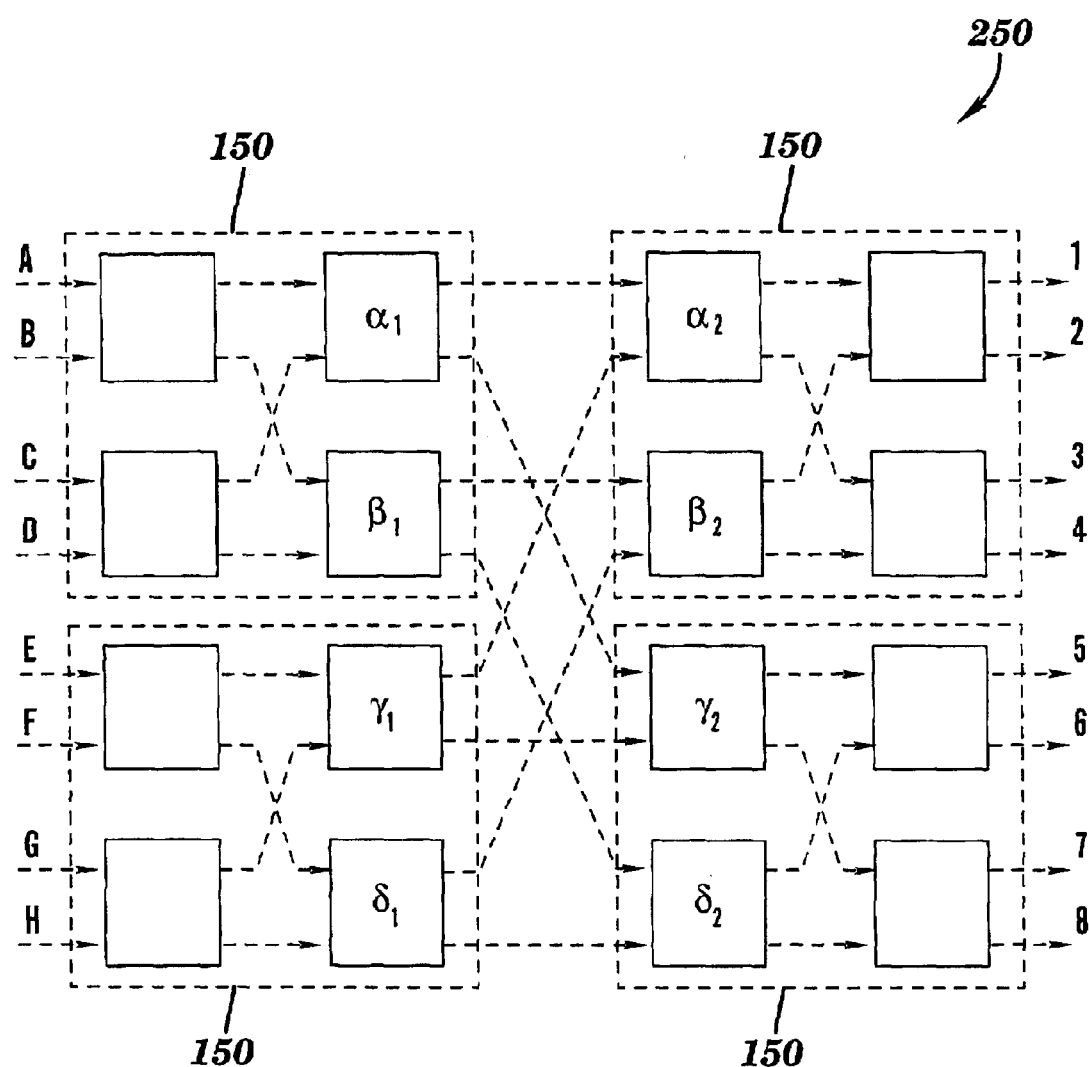
FIG. 7 is a block diagram of one embodiment of an 8×8 switch of the present invention.

As shown in FIG. 7, 4×4 switches 150 may be interconnected utilizing the Beneš architecture to form an 8×8 interconnect switch 250. The requirements of the Beneš logic include coupling switch $α_1$ to switch $α_2$ and $γ_2$, coupling switch $β_1$ to switch $β_2$ and $δ_2$, and so on, as shown. Tracing paths through this system show that signals from input A may be routes to any one of the eight output ports 1–8. This switch 250 thus satisfies the logic requirements of the Beneš network, and therefore may employ a well known routing algorithm to selectively activate the π-cells 120 to switch the N inputs to any combination of N outputs as will be discussed in greater detail hereinbelow. Furthermore, this implementation is scalable to an N×N switch using 4×4 switch 150 as the fundamental, repeating element.

Figure 8:
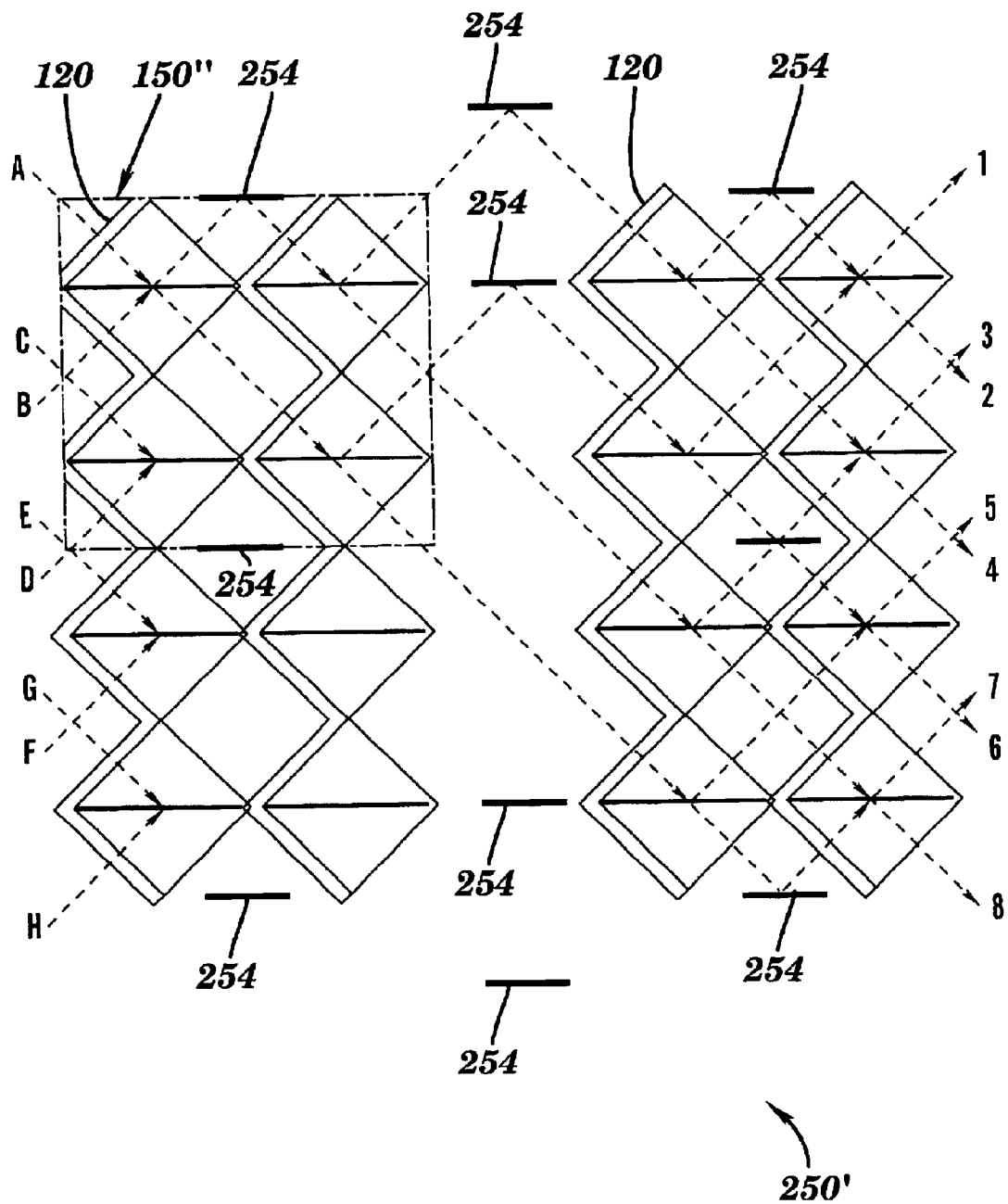
FIG. 8 is a partially schematic representation of the switch of FIG. 7.

Turning to FIG. 8, a hardware implementation of Beneš switch 250 is shown as switch 250'. As shown, this implementation utilizes four 4×4 switch elements 150" and two extra pairs of mirrors 254. Advantageously, this switch 250' of the present invention provides contention-free routing of N signals using N fewer 2×2 switches than prior art configurations. In this regard, it is generally acknowledged that to provide contention-free routing it is necessary to employ $N(\log_2 N)$ 2×2 switches. The switch 250' of the present invention, however, requires only $N(\log_2 N-1)$ 2×2 switches. This substantial improvement is provided by the all-optical nature of switch 250' and the aforementioned use of a single polarizer 110 to switch a pair of inputs rather than using a separate polarizer 110 for each input.

As mentioned hereinabove, in a conventional switch, contention results when two signals attempt to take the same path. Snce such paths may accommodate only one signal at a time, one signal must "wait" until the path is free before it can be routed. Contentions make routing algorithms relatively complicated, and decrease the performance of the network to which the switch is coupled. The all-optical switch of the present invention advantageously enables two signals to share the same path between any two nodes or signal intersections. Unlike electronic signals, optical signals have two orthogonal states i.e., polarizations P1 and P2, which may occupy the same path, remain distinct, and not interfere with one another. In the implementations of the present invention, after sharing a path, the two signals will automatically split when they encounter the next polarizer 110, ensuring that in the event a path is shared, the path will only be shared for a single segment (i.e., for a single 2×2 switch), This Beneš network architecture thus provides contention-free routing, constant latency, uniform transmission for each channel and scalability, etc. However, additional embodiments of the present invention are described hereinbelow which advantageously eliminate the need for several mirrors 254 to further simplify the present invention.

Figure 9:
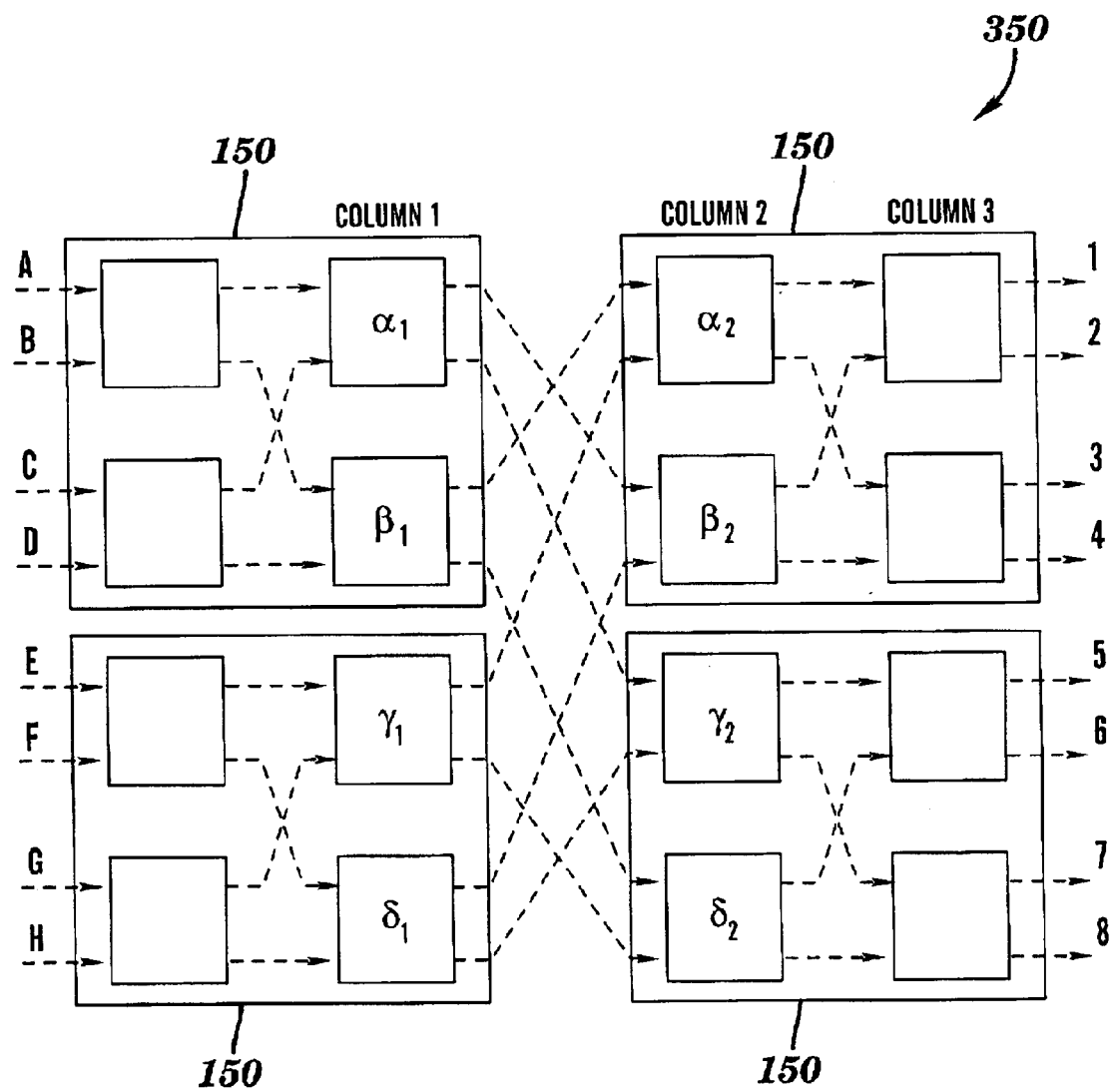
FIG. 9 is a block diagram of an other embodiment of an 8×8 switch of the present invention.

Turning now to FIG. 9, an alternate embodiment of the present invention is shown as 8×8 switch 350. This switch utilizes a PM2K architecture having a slightly different routing logic from the Beneš network of FIG. 7, while retaining the ability to route N signals in a contention-free manner, with constant latency and constant attenuation.

Figure 10:
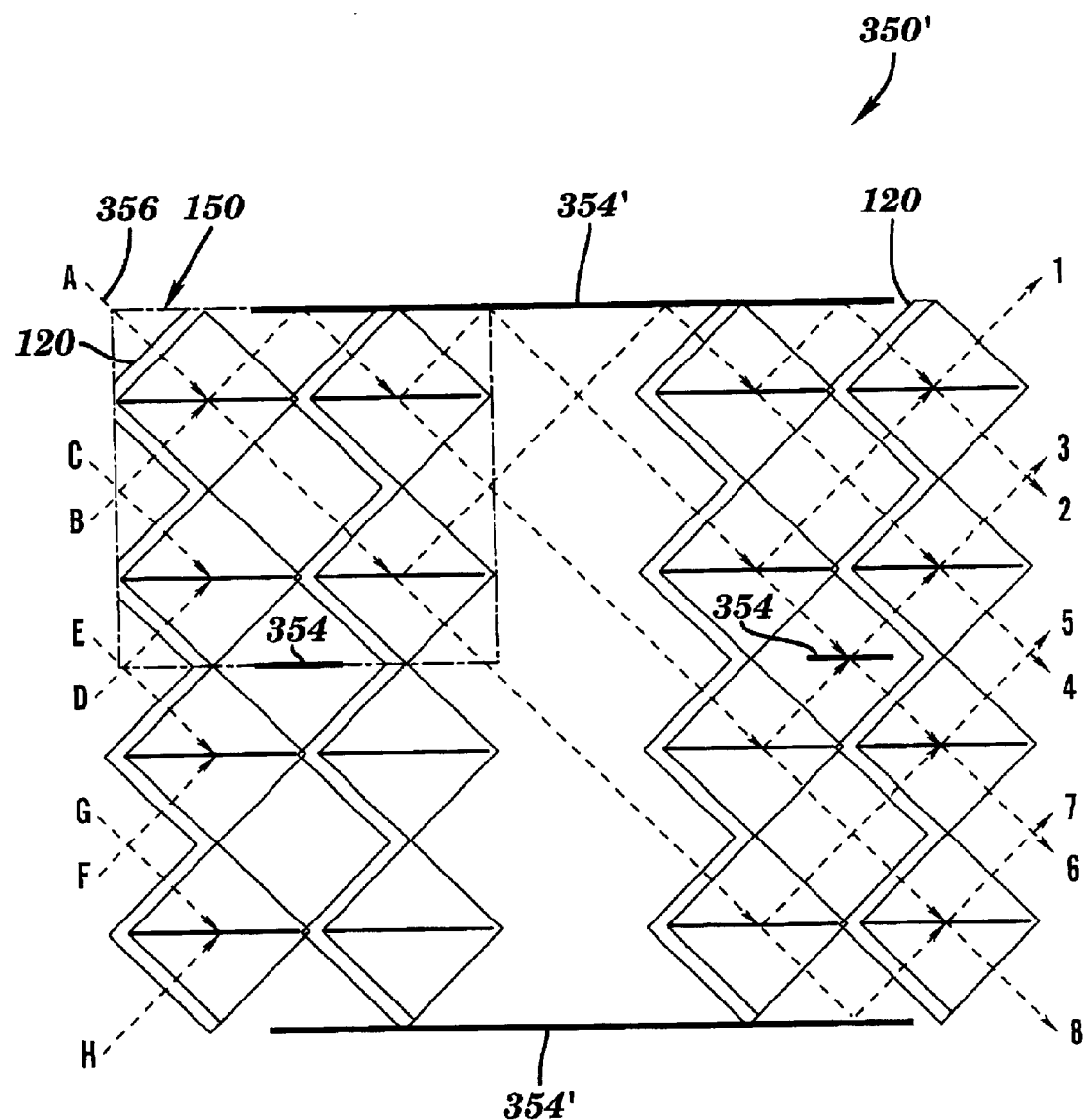
FIG. 10 is a partially schematic representation of the switch of FIG. 9.
Figure 11:
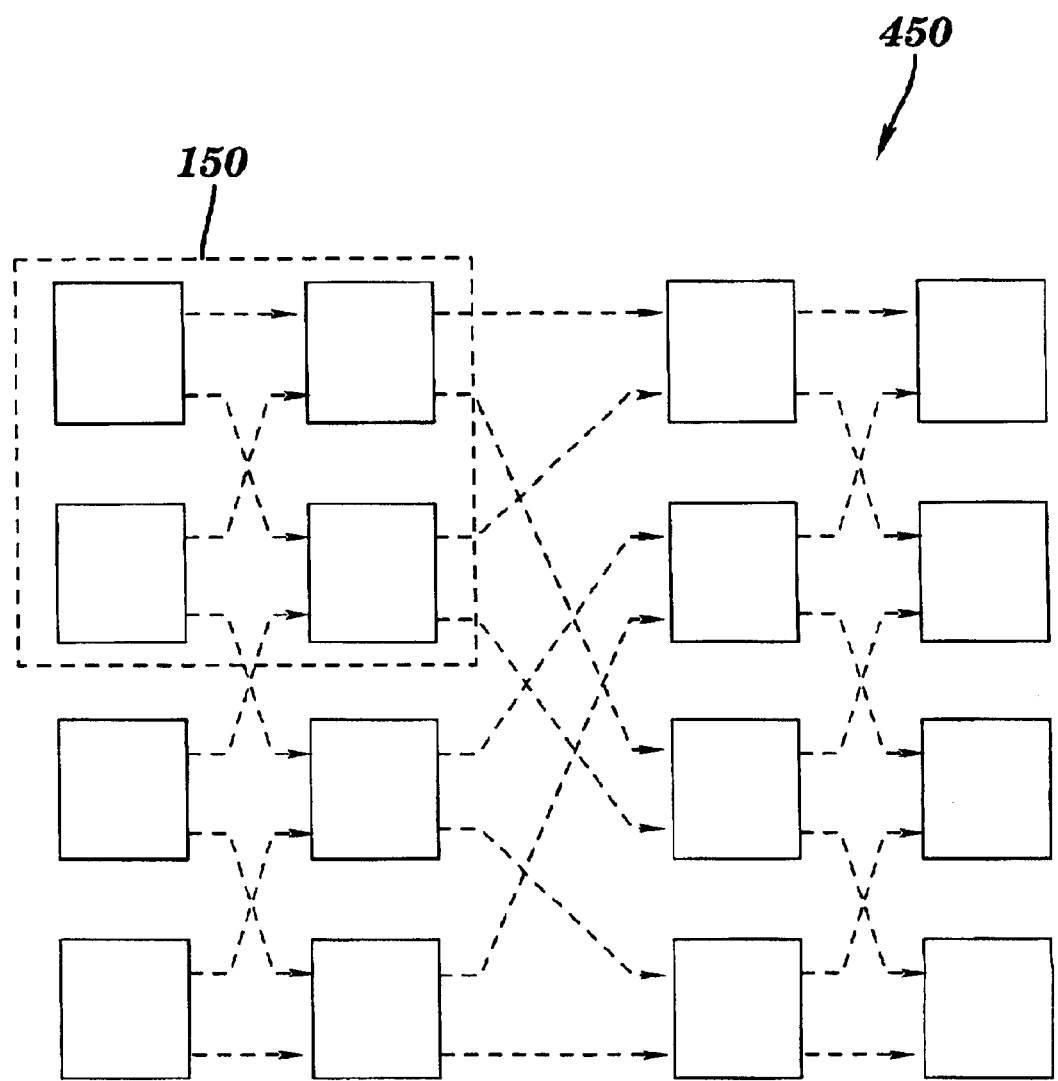
FIG. 11 is a block diagram of a further embodiment of an 8×8 switch of the present invention.
Figure 12:
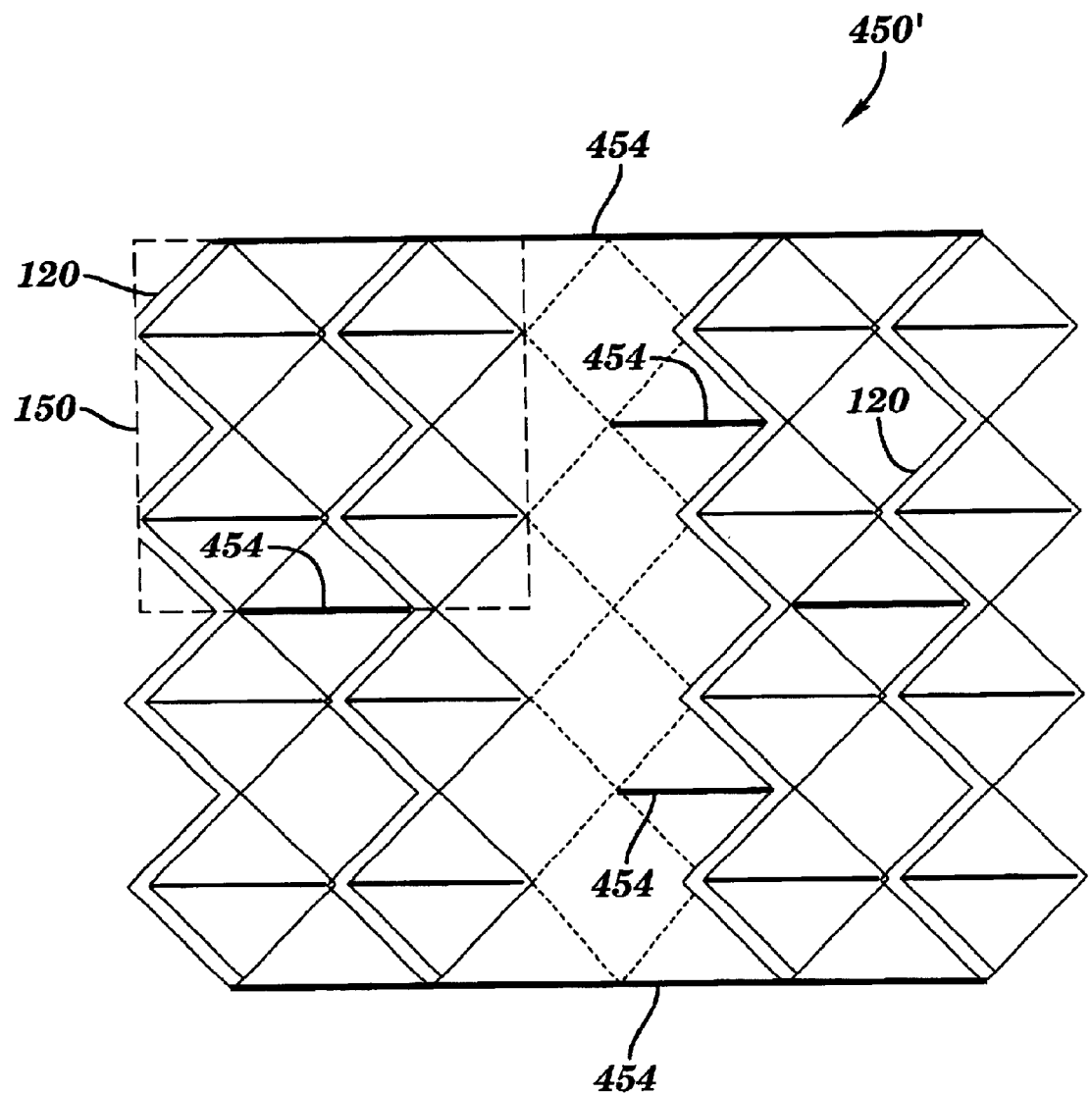
FIG. 12 as a partially schematic representation of the switch of FIG. 11.
Figure 13:
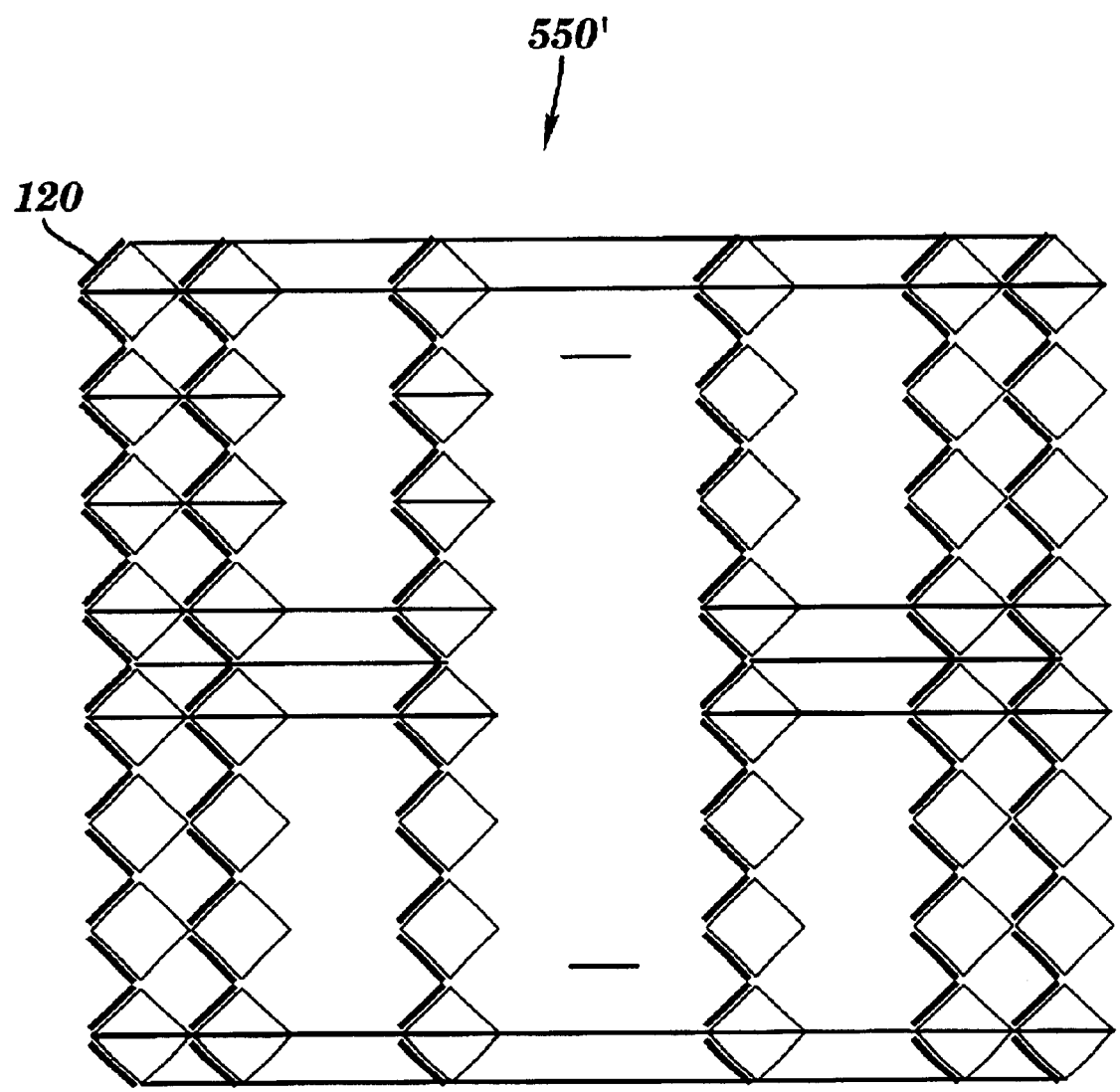
FIG. 13 is a partially schematic representation of an embodiment of a 16×16 switch of the present invention.

A hardware implementation of switch 350 according to the present invention is shown as switch 350' in FIG. 10. As shown, this implementation is similar to switch 250', while switch 350' satisfies its routing logic requirements with fewer mirrors than switch 250'. Signal routing between input A and all eight possible output ports is shown by dotted lines 356. Switch 350' advantageously utilizes fewer mirrors to reduce manufacturing costs relative to the Beneš architecture of switch 250'. Moreover, this switch 350' provides a more compact design which facilitates scaling to higher N values, since mirrors required for the Beneš switch 250' tend to increase the width of the device relative to switch 350'. Thus, advantageously, in addition to allowing for full contention-free routing with constant latency and uniform loss, switch 350' may be conveniently monolithically constructed as a single solid state device. Moreover, switch 350' achieves its full contention-free routing with only $N(\log_2 N-1)$ elemrents. Loss and crosstalk are uniform and relatively low, and well known routing algorithms may be utilized as will be discussed hereinbelow.

While several architectures of the present invention have been shown, it should be understood that one skilled in the art after studying the present invention, may apply the invention to other architectures without departing from the spirit and scope of the present invention. One example of such an other architecture includes a conventional shuffle-exchange 4×4 interconnect shown as switch 450 in FIG. 11. A hardware implementation of switch 450 according to the present invention is shown as switch 450' in FIG. 12.

As mentioned hereinabove, the aforementioned switch of the oresent invention may be scaled to higher numbers N of input and output channels. For example, as shown in FIG.

13, the Beneš architecture of FIG. 8 may be scaled to a 16×16 switch 550'. All of the architectures of the present invention may be similarly scaled to 16×16, 32×32, 64×64 or greater N×N architectures. Scaling the switch in this manner preserves the characteristics of the present invention of constant latency, loss and crosstalk, etc.

Figure 14:
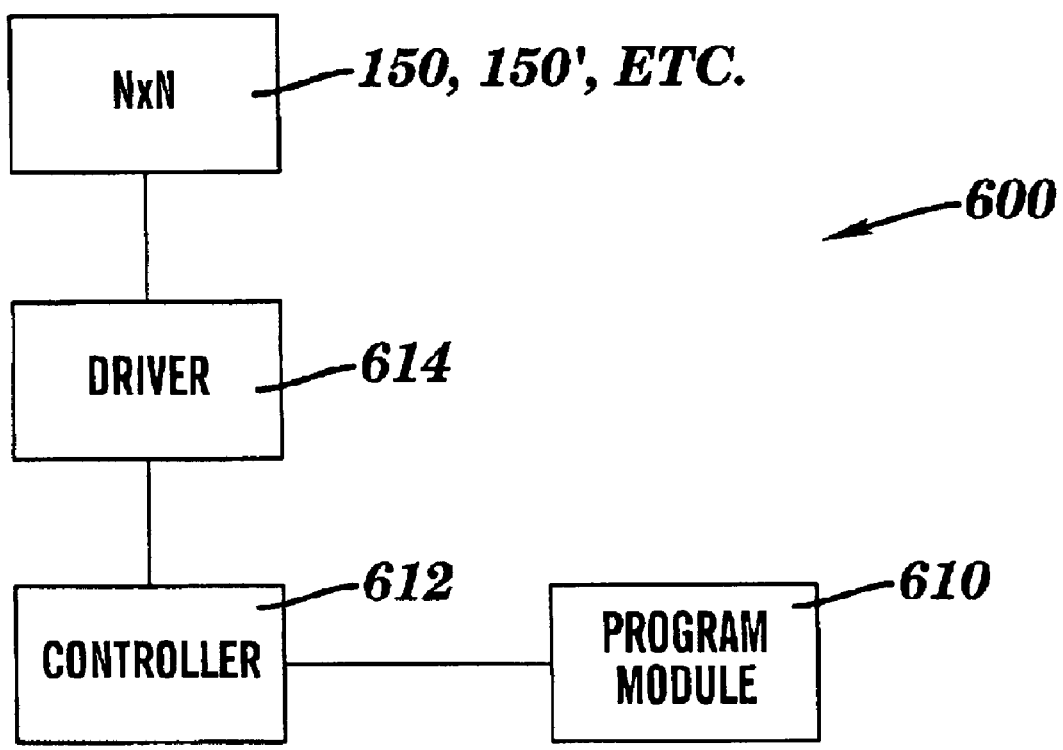
FIG. 14 is a block diagram of an interconnect system including an N×N switch of the present invention.

Turning now to FIG. 14, any of the aforementioned switches 150, 150', 150", 250, 250', 350, 350', 450, 450', 550', etc., may be incorporated into an interconnect system 600. As shown, interconnect system 600 is preferably a computer implemented device including a program module 610 which includes a computer usable medium having computer readable program code or instructions embodied therein. The program code includes any of various conventional routing algorithms as discussed hereinabove. The program module is disposed in communication with a controller 612 adapted to operate in a conventional manner to control access to the program module 610 by the computer sub-system (not shown). Controller 612 is disposed in communication with a driver 614 which operates in a conventional manner to interface with the switch 150, 155', etc. Driver 614 may comprise a hardware device or, preferably, may be implemented in software as a software module. Program module 610, controller 612 and driver 614 thus comprise control means adapted to operate the N×N switches for routing signals between each input and output port as shown and described hereinabove.

The switches of the present invention may be manufactured in any suitable manner, including but not limited to, the fabrication methods disclosed in the above referenced '440 application, and other techniques including photolithographic masking and etching techniques commonly used in the semiconductor fabrication industry.

The forgoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. An optical interconnect system comprising:
   an optical interconnect device configured to selectively interconnect a plurality of electromagnetic signals between a plurality of inputs and a plurality of outputs;
   said optical interconnect device having a plurality of solid state selectively actuatable 2×2 optical switching elements and a plurality of all-optical signal paths extending through said 2×2 optical switching elements between the plurality of inputs and the plurality of outputs, said 2×2 optical switching elements capable of causing switching between polarization states of said electromagnetic signals;
   wherein each of said plurality of all-optical signal paths has substantially the same pathlength.

2. The interconnect system of claim 1, comprising a switching module configured to selectively actuate each of said 2×2 optical switching elements.

3. The optical interconnect system of claim 2, wherein said switching module comprises a computer usable medium having computer readable program code embodied therein for seletively actuating each of said 2×2 optical switching elements, said computer readable program code including a routing algorithm.

4. The optical interconnect system of claim 3, further comprising a driver disposed in operative engagement with said switching module.

5. The optical interconnect system of claim 4, comprising a controller operatively engaged with said switching module and with said driver, to control said operative engagement of said switching module with said driver.

6. The interconnect system of claim 1, wherein each of said 2×2 optical switching element comprises:
   a polarizer disposed to receive electromagnetic energy incident thereon from at least two input paths, and to transmit electromagnetic energy along at least two output paths;
   at least one phase shifter disposed within said at least two input paths; and
   said at least one phase shifter being selectively actuable to pass eletromagnetic energy therethrough alternately with and without shifting the phase thereof.

7. The interconnect system of claim 6, wherein said polarizer is disposed at an intersection of said at least two input paths and said at least two output paths.

8. The interconnect system of claim 6, wherein electromagnetic energy incident on said polarizer from any one of said at least two input paths is transmittable along any one of said at least two output paths.

9. The interconnect system of claim 6, further comprising at least one phase shifter disposed in each of said at least two input paths, wherein a plurality of said phase shifters are independently actuatable relative to one another.

10. The interconnect system of claim 9, wherein each of said phase shifters is substantially planar and disposed orthogonally relative to the input path passing therethrough.

11. The interconnect system of claim 6, wherein said phase shifter is disposed in spaced relation relative to said polarizer, so that said at least two output paths are free from said phase shifter.

12. The interconnect system of claim 6, wherein said at least two input paths are mutually orthogonal, and said at least two output paths are mutually orthogonal.

13. The interconnect system of claim 11, wherein said polarizer is substantially planar and disposed at a 45 degree angle to each of said at least two input paths.

14. The interconnect system of claim 13, comprising:
   a solid being transparent to said electromagnetic energy;
   said solid having four mutually orthogonal faces;
   said planar polarizer disposed at a 45 degree angle to each of said four mutually orthogonal faces; and
   at least one phase shifter being disposed on each of two adjacent ones of said four mutually orthogonal faces;
   wherein said output paths pass through two adjacent other ones of said four mutually orthogonal faces.

15. The interconnect system of claim 6, further comprising a computer usable medium having computer readable program code embodied therein for selectively actuating said at least one phase shifter, wherein said computer readable program code includes a routing algorithm.

16. The optical interconnect system of claim 1, wherein each of said plurality of all-optical signal paths has substantially the same latency.

17. The optical interconnect system of claim 1, wherein each of said plurality of all-optical signal paths are contention-free relative to one another.

18. The optical interconnect system of claim 17, wherein each of said plurality of all-optical signal paths are adapted to simultaneously maintain a plurality of electromagnetic signals therein.

19. The optical interconnect system of claim 1, wherein each of said plurality of all-optical signal paths provides substantially the same signal attenuation relative to one another.

20. The optical interconnect system of claim 1, furher comprising:

N inputs and N outputs;

said plurality of all-optical signal paths being contention-free and adapted to couple each of said N inputs to each of said N outputs, using $N(\log_2 N-1)$ of said optical switching elements.

21. The optical interconnect system of claim 1, wherein each one of said optical switching elements further comprises:

a solid being transparent to said electromagnetic signals;

said solid having four mutually orthogonal faces;

said planar polarizer being disposed at a 45 degree angle to each of said four mutually orthogonal faces;

at least one phase shifter being disposed on two adjacent ones of said four mutually orthogonal faces; and each of said plurality of said optical switching elements being disposed in corner to corner relation to one another.

22. The optical interconnect system of claim 1, wberein said optical switching elements each comprise:

a solid being transparent to said electromagnetic signals;

said solid having four mutually orthogonal faces;

said planar polarizer being disposed at a 45 degree angle to each of said four mutually orthogonal faces;

at least one phase shifter being disposed on two adjacent ones of said four mutually orthogonal faces; and each of said optical switching elements being disposed in surface to surface relation to one another.

23. The optical interconnect system of claim 1, comprising:

a 4×4 interconnect block having first, second, third and fourth 2×2 optical switching elements;

wherein an output path of said first 2×2 switching element is coupled to an input path of said third 2×2 switching element, an other output path of said first 2×2 switching element is coupled to an input path of said fourth 2×2 switching element, an output path of said second 2×2 switching element is coupled to input of said third switching element, said an other output path of said second switching element is coupled to an input path of said fourth 2×2 switching element.

24. The optical interconnect system of claim 23, wherein said first, second, third and fourth 2×2 switching elements are disposed in surface to surface alignment with one another.

25. The optical interconnect system of claim 23, wherein said first, second, third and fourth 2×2 switching elements are disposed in corner to corner alignment with one another.

26. The optical interconnect system of claim 25, further comprising a plurality of said 4×4 interconnect blocks.

27. The optical interconnect system of claim 23, wherein input paths of said first and second 2×2 switching elements comprise inputs of said 4×4 optical interconnect block, and outputs of said third and fourth 2×2 switching element comprise outputs of said 4×4 interoonnect block.

28. The optical interconnect system of claim 27, further comprising a plurality of said 4×4 interconnect blocks coupled to one another.

29. The optical interconnect system of claim 28, being fabricated as a unitary device.

30. The optical interconnect system of claim 29, further comprising a plurality of mirrors disposed therein.

31. The optical interconnect system of claim 28, further comprising an 8×8 device.

32. The optical interconnect system of claim 28, further comprising a 16×16 interconnect device.

33. The optical interconnect system of claim 28, wherein said 4×4 interconnect blocks are coupled to one another in a Benes Network.

34. The optical interconnect system of claim 28, wherein said 4×4 interconnect blocks are coupled to one another in a PM2K network.

35. The optical interconnect system of claim 28, wherein said 4×4 interconnect blocks are coupled to one another in a shuffle exchange architecture.

36. The optical interconnect system of claim 1, further comprising a N×N device, where N is the number of inputs and outputs.

37. A method for selectively interconnecting a plurality of electromagnetic signals between a plurality of inputs and a plurality of outputs, the method comprising:

providing a plurality of solid state selectively actuatable 2×2 optical switching elements;

configuring the 2×2 optical switching elements to form an optical interconnect device having a plurality of all-optical signal paths extending through the 2×2 optical switching elements between the inputs and the outputs, wherein each of the all-optical signal paths has substantially the same pathlength; and selectively actuating the 2×2 optical switching elements to interconnect the electromagnetic signals between the inputs and the outputs by switching the polarization states of said electromagnetic signals.

\* \* \* \* \*